Dec. 16, 1952        R. J. ETBAUER        2,621,837
SPARE WHEEL MOUNTING BRACKET
Filed April 3, 1951
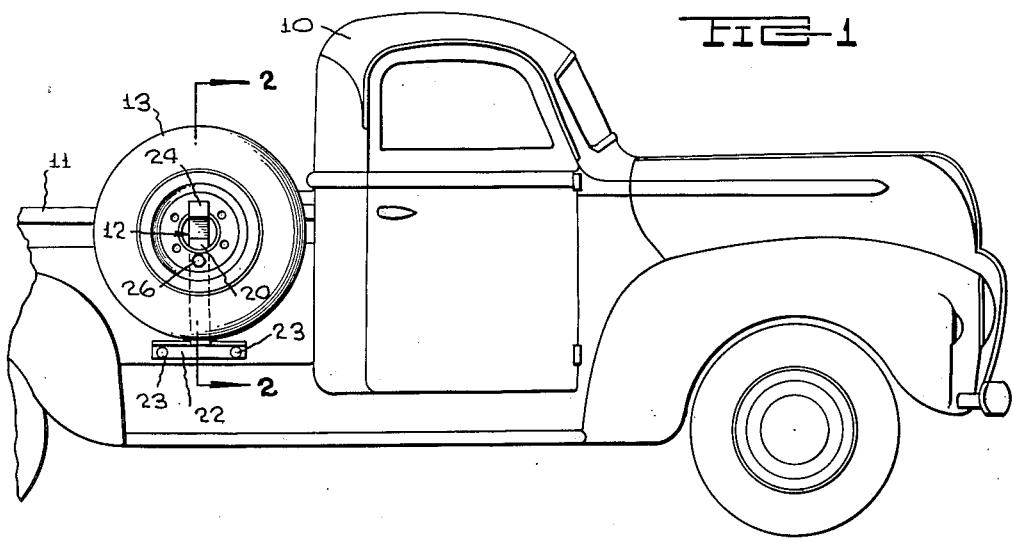
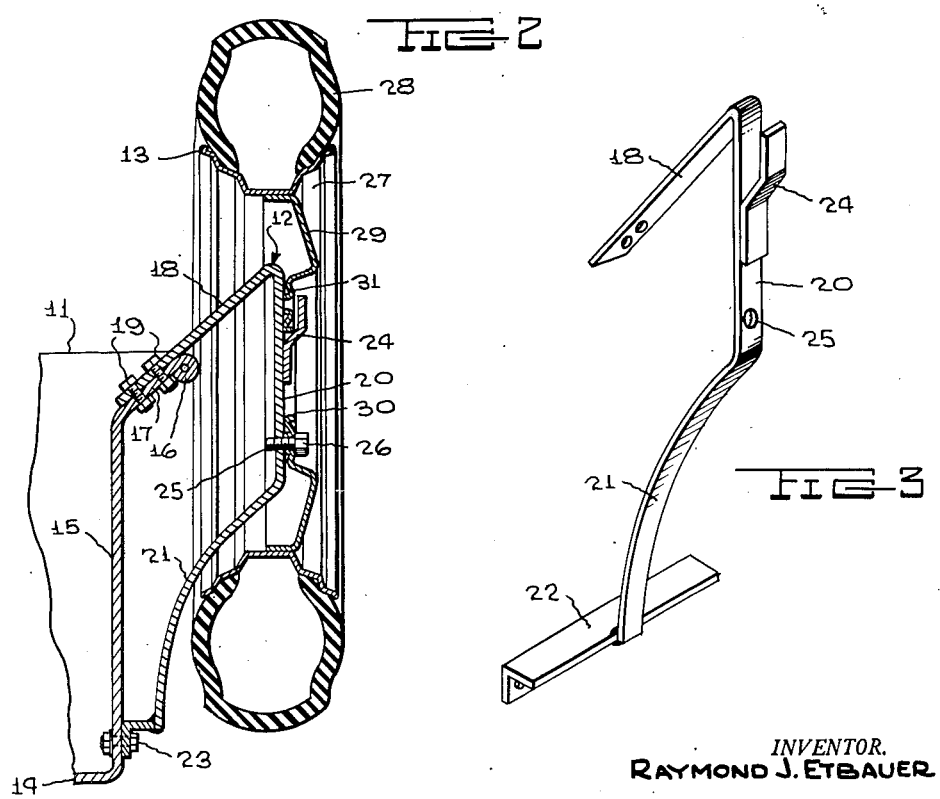
INVENTOR.
RAYMOND J. ETBAUER
BY
McMorrow, Berman & Davidson
ATTORNEYS Patented Dec. 16, 1952

2,621,837

UNITED STATES PATENT OFFICE 2,621,837

SPARE WHEEL MOUNTING BRACKET

Raymond J. Etbauer, Wessington Springs, S. Dak.

Application April 3, 1951, Serial No. 218,961

1 Claim. (Cl. 224—42.24)

This invention relates to spare wheel mounting brackets and more particularly to a spare wheel mounting bracket for a truck having an open body, such as a pick-up truck.

It is among the objects of the invention to provide an improved spare wheel carrying bracket that can be easily mounted on an open truck body with no material modification of the body construction; which will receive a spare truck wheel and support the wheel at a convenient location on the truck body; which mounts the wheel with a single stud bolt so that the wheel is easy to mount and remove; which can be easily detached from the body when desired, and which is simple and durable in construction, economical to manufacture and easy to install.

Other objects and advantages will become apparent from a consideration of the following description and the appended claims in conjunction with the accompanying drawing wherein:

Figure 1 is a fragmentary side elevational view of a truck having an open top body and showing a spare wheel mounted on the truck body by a mounting bracket illustrative of the invention;

Figure 2 is a fragmentary cross sectional view on an enlarged scale on the line 2—2 of Figure 1; and Figure 3 is a perspective view of the mounting bracket.

With continued reference to the drawing, the truck, as illustrated, has a cab 10 and an open top body 11 mounted on the truck directly behind the cab. The mounting bracket, as generally indicated at 12, is mounted on a side wall of the body near the rear side of the cab 10 and a spare wheel 13 is mounted on this bracket and supported outwardly of the adjacent side wall of the truck body and adjacent the rear side of the cab where it is not in the way of loading or unloading the body and yet is readily accessible for use when needed.

The truck body 11 has a bottom 14 and a side wall 15 upstanding substantially perpendicularly from the corresponding edge of the bottom 14 and provided at its upper edge with an outwardly and upwardly extending portion 16 terminating in a rolled bead 17 which extends along the upper edge of the side wall.

The mounting bracket 12 includes a length of strap metal having substantially parallel side edges and a width and thickness sufficient to provide the necessary mechanical strength to support the wheel 13 on the truck body 11. This strap includes at one end a first substantially straight portion 18, the outer end of which rests upon the upper surface of the upwardly and outwardly inclined portion 16 of the side wall 15 and is provided with apertures registering with the corresponding apertures in the portion 16 to receive bolts 19 which firmly secure the corresponding end of the bracket strap to the portion 16 of the body side wall 15. The strap further includes a second substantially straight portion 20 extending from the inner end of the portion 18 and a third portion 21 extending from the end of the portion 20 remote from the portion 18 and longitudinally curved, as is particularly illustrated in Figures 2 and 3. The portion 20 is disposed at an angle to the portion 18 such that when the portion 20 is secured to an upwardly and outwardly inclined portion at the upper edge of a truck body side wall the portion 20 is spaced outwardly from the side wall and substantially parallel thereto and the longitudinal curvature of the portion 20 is such that this portion extends from the end of the portion 20 remote from the portion 18 back substantially to the side wall 15 of the truck body at a location spaced below the outer end of the portion 18 and near the bottom 14 of the body. The portion 18 of the strap is disposed substantially at right angles to the edge bead 17, so that the entire bracket is substantially vertically disposed when the top edge of the body is substantially horizontal.

A member 22 conveniently formed of a length of suitable structural angle iron is secured at the mid-length location of one outer edge thereof to the portion 21 at the end of this portion remote from the portion 20 and is provided with apertures spaced apart longitudinally thereof which register with corresponding apertures provided in the body side wall 15 to receive bolts 23 for securing the lower end of the bracket to the body side wall 15 near the bottom 14 of the truck body.

A tongue 24 is mounted on the outer side of the portion 20 of the bracket strap intermediate the length of this portion and extends in spaced relationship to the outer surface of the portion 20 toward the juncture between the portions 20 and 18 to receive the inner edge of the wheel 13 and the portion 20 is provided with a tapped hole 25 spaced from the tongue 24 in a direction away from the portion 18 of the bracket. A stud bolt 26 extends through a bolt receiving aperture in the wheel near the inner edge of the wheel and is threaded into the hole 25 to clamp the wheel to the mounting bracket.

The wheel 13 is of well known construction including a tire rim 27 carrying a tire 28 and mounted on the periphery of a wheel disc or web 29 provided with a centrally located hub receiving opening providing an inner edge 30 and with apertured boss formations 31 angularly spaced apart around the inner edge 30 to provide hub bolt receiving apertures. The thickness of the disc adjacent the inner edge thereof, including the apertured bosses 31 and the inner flange of the wheel, is only slightly less than the distance between the tongue 24 and the adjacent outer surface of the bracket portion 20 so that the wheel is suspensively supported by the tongue 24 from the body side wall 15 and is clamped to the bracket against vibration and rattling by the stud bolt 26.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

A spare wheel mounting bracket for a truck body having a side wall provided with an upwardly and outwardly inclined portion at its upper edge comprising a metal strap having at one end a first substantially straight portion adapted to rest at its outer end on the upwardly and outwardly inclined portion of a truck body side wall and project upwardly and outwardly therefrom, said first substantially straight portion being apertured near its outer end for the reception of fasteners to secure it to an associated truck body portion, a second substantially straight portion extending from the inner end of said first portion and disposed at an angle to said first portion such as to dispose said second portion substantially parallel to a truck body wall to which said first portion is connected and a third portion extending from the end of said second portion remote from said first portion and longitudinally curved to extend from the corresponding end of said second portion to a body wall on which the bracket is mounted at a location disposed below the outer end of said first portion, an angle member secured to said third portion at the outer end of the latter and apertured to receive fasteners for connecting it to a body wall, and a tongue on said second portion extending in spaced relationship to the latter toward the juncture between said first and second portions for receiving the inner edge of a wheel and suspensively supporting such wheel from a truck body, said second portion having a tapped hole therein spaced from said tongue toward said third portion to receive a stud bolt for clamping a wheel on the bracket.

RAYMOND J. ETBAUER.

REFERENCES CITED

The following references are of record in the file of this patent:

UNITED STATES PATENTS

| Number | Name | Date |
|---|---|---|
| 1,448,304 | Kirkwood | Mar. 13, 1923 |
| 1,629,478 | Clark | May 24, 1927 |
| 1,765,785 | Baker | June 24, 1930 |